Aug. 18, 1959     F. R. STRATE     2,900,138
METAL POWDER WELDING APPARATUS
Filed April 5, 1954     2 Sheets-Sheet 1

INVENTOR.
FRANK R. STRATE
BY
Beau, Brooks, Buckley & Beau,
ATTORNEYS.

Aug. 18, 1959   F. R. STRATE   2,900,138
METAL POWDER WELDING APPARATUS
Filed April 5, 1954   2 Sheets-Sheet 2

INVENTOR.
FRANK R. STRATE
BY
Beau, Brooks, Buckley & Beau,
ATTORNEYS.

2,900,138
METAL POWDER WELDING APPARATUS
Frank R. Strate, Alden, N.Y.

Application April 5, 1954, Serial No. 421,148

11 Claims. (Cl. 239—61)

This invention relates to metal depositing processes, and more particularly to an improved method and apparatus for application of particulate welding or brazing metal to a workpiece for fused deposit thereon, as for example in the making of welded or brazed joints or the like.

Prior devices for this purpose have involved complicated and inflexible powder feeding apparatus, and heavy and eloborate torch arrangements which have depended upon complex fluid dynamic forces for their operation, and have in general been large and costly as well as cumbersome and inflexible in use. On the other hand, attempts to provide a simpler apparatus have resulted in ineffective and inefficient devices.

Accordingly, it is a primary object of the present invention to provide an improved method and apparatus for the fused deposit of metal powder on a workpiece.

Another object of the invention is to provide an improved and simplified method of, and means for, metal powder feed in a process as aforesaid.

Still another object of the invention is to provide an apparatus as aforesaid in which an improved and effective control of the rate of feed of the metal powder to the torch is provided embodying increased flexibility of control and adaptability to the use of various metal powders.

Another object of the invention is to provide apparatus as described embodying an unusually simple torch construction which together with the feed facilities of the invention provide a fully efficient and effective metal depositing apparatus.

Still another object of the invention is to provide a metal powder applying and fusing apparatus of improved simplicity and ruggedness of structure embodying a light-weight torch enabling unusual freedom of movement in use.

Other objects of the invention will be apparent from the following description and claims, and from the drawings in which:

Figure 1:
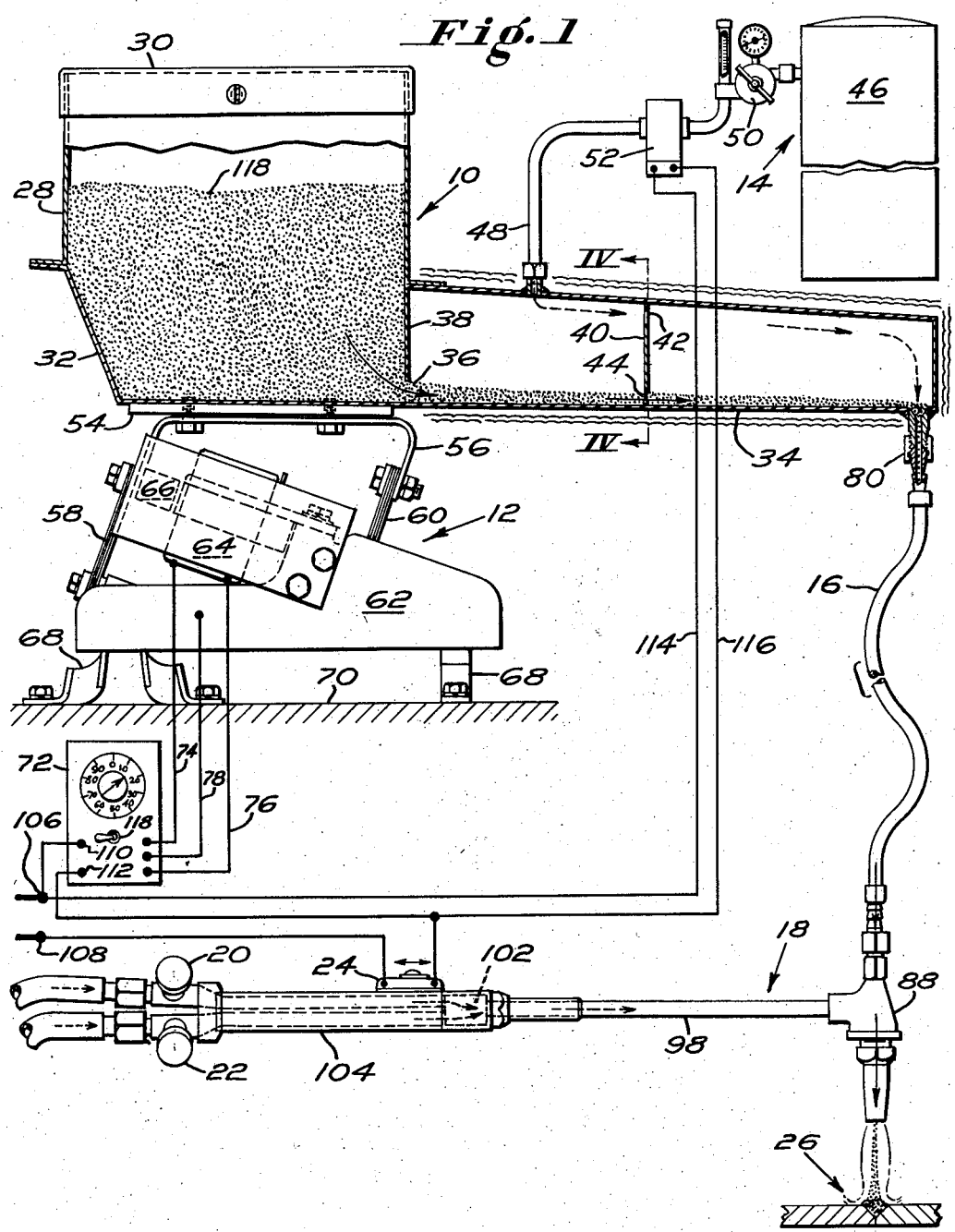
Fig. 1 is a general, partly sectioned, elevational view, showing an apparatus of the invention in use in the making of a welded joint.

Referring more particular to the drawings, a preferred embodiment of the metal depositing apparatus of the invention is shown, and comprises a powder feeding and metering device 10 which includes a vibrator mount 12 and is provided with a deliver pressure supply 14. The powder feeding device is connected by means of a rubber or other flexible conduit 16 to a powder depositing and fusing gas fired torch 18 which is provided with flame controls 20, 22 and a powder feed control switch 24. Thus the apparatus shown is arranged and adapted to deposit and fuse powdered metal on a workpiece, as for example in the making of a weld as indicated at 26.

As shown in Fig. 1, the powder feeding device 10 is provided with a powder storage hopper 28 which has a gas-tight lid or filling hatch 30 and is provided with a trough shaped bottom portion 32. The hopper bottom portion 32 is continuous with a closed, gas tight trough extension 34 cantilever mounted by the hopper structure, and this trough 34 has communication with the hopper through a metering opening 36 at the bottom of a baffle forming portion of the intermediate hopper wall 38.

Figure 4:
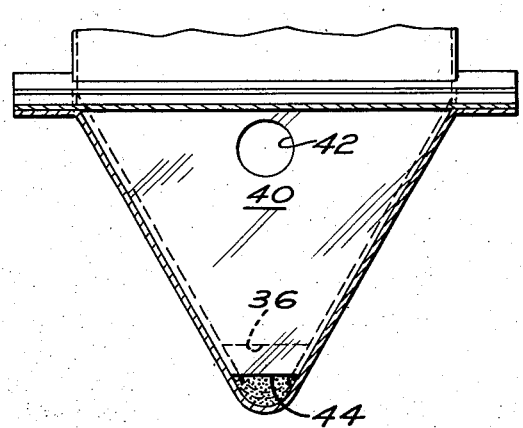
Fig. 4 is a sectional view about on line IV—IV of Fig. 1, on an enlarged scale.
Figure 3:
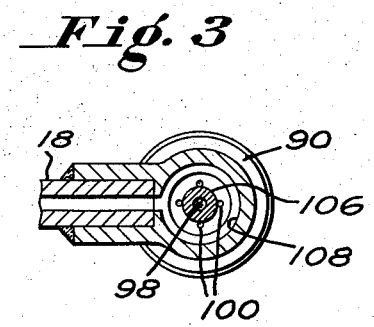
Fig. 3 is a sectional view about on line III—III of Fig. 2.

As shown most clearly in Fig. 4, the bottom of the trough 34 and the adjacent hopper bottom are generally V shaped, and are mounted with a small downward slope, in the order of 1°, toward the outer end of the trough. Intermediate the hopper and outer ends thereof the trough 34 is provided with a second powder metering baffle 40, which is provided with a gas pressure equalizing vent 42 in its upper portion and forms at its lower edge a second powder feed metering aperture 44 in combination with the trough bottom. As shown in the drawing, this second aperture 44 is in the order of about ½ the cross-sectional area of the first aperture 36, for reasons which will appear hereinafter.

The powder feeding pressure supply 14 comprises a tank 46 or other suitable source of compressed gas which is connected to the trough 34, preferably near the hopper end thereof, by means of a conduit 48. The conduit 48 includes a flow metering regulator 50 which may be of standard commercial make, and a solenoid controlled valve 52 which may also be of standard construction, so that inert or other gas may be delivered from the source 46 at a predetermined rate of flow to the trough structure when the solenoid valve 52 is open. The preferred regulator 50 shown comprises a two stage pressure regulator with a flow measuring gauge, the regulator being adjustable to secure the desired flow as indicated by the gauge whereupon the flow will remain constant, assuming constant outlet resistance to the flow.

The feeding device 10 of the invention is provided with a plate 54 at the bottom of the hopper end thereof by which it is mounted on a movable bracket structure 56 of the vibrator mount 12. The bracket 56 includes flexible legs 58, 60 by which it is mounted on the frame 62 of the vibrator, and an electromagnet 64 carried by the frame 62 cooperates with an armature 66 on one of the legs 58 to impart a motion to the bracket structure. The vibrator frame 62 is in turn provided with live rubber mount legs 68—68 for attachment to a machine base or other suitable mounting platform 70. As shown in Fig. 1 the spring legs of the bracket 56 are preferably arranged diagonally so that operation of the vibrator magnet 64 imparts a motion to the hopper 10 having horizontal and vertical components. Supplementary to this essentially translational motion, it will be seen that the rubber containing legs 68 permit a degree of rotational vibratory motion about an axis beneath the hopper 28 providing an additional vertical component of motion to the free end of the cantilevered trough 34.

Means are provided to vary the degree of vibratory motion, and in the preferred vibrator arrangement shown this adjustment is embodied in a rheostat control 72 arranged to vary the voltage supplied to the electromagnet 64 through connecting wires 74, 76, so as to correspondingly vary the amplitude of the vibration imparted to the hopper. Accordingly, the frequency of vibration may be constant, and may be determined simply by the frequency of the current, or of an A.C. component of the current, supplied to the electromagnet 64. If desired, the control 52 and the vibrator base 56 may be grounded, as by a wire 78, for reasons of safety.

Figure 2:
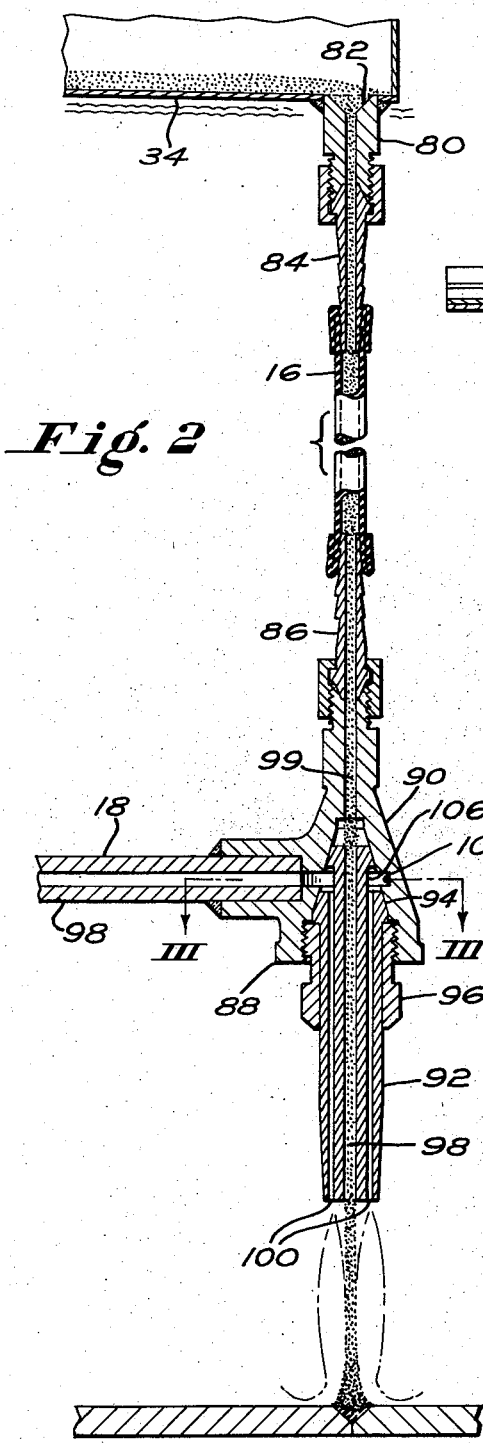
Fig. 2 is an enlarged sectional view of a portion of the powder feed and torch assembly of Fig. 1.

As shown in Figs. 1 and 2, the outer or free end of the cantilevered trough 34 is provided with a powder outlet fitting 80, the powder receiving opening of which is preferably conically chamfered or funnel shaped as shown at 82. The fitting 80 is provided with a suitable nipple 84 which is adapted for connection to the flexible conduit 16, the other end of which is connected by a similar nipple member 86 to the powder applying torch 18 of the invention.

As shown more clearly in Fig. 2, the head 88 of the torch 18 comprises a generally conical housing or socket portion 90 and a torch tip piece 92 having a tapered seal portion 94 which fits tightly within the housing and is held in place by a threaded collar 96. The torch tip piece 92 is provided with a straight central bore 98 in alignment with the powder feed bore 99 of the housing 90, and with one or more adjacently disposed parallel flame gas bores or nozzles 100. These latter bores 100 are fed with a gas mixture, such as oxygen and acetylene, from a flame gas mixing chamber 102 in the handle 104 of the torch, through registering annular grooves 106, 108 in the mating surfaces of the tip piece and housing having communication with the bores 100 and the chamber 102, respectively. Thus the flame producing facilities of the torch are of known construction, and while the arrangement shown is preferred, other known torch constructions may be utilized. However, it should be noted that the powder delivery passageway segments of the preferred torch shown are straight and in alignment and that no particular powder distributing configuration is necessary in them, proper delivery of the powder being provided for by other means as will appear more fully hereinafter. It should be noted also that the powder delivery is preferably isolated from the flame gases within the torch, and that the flame and powder streams issuing therefrom are preferably substantially parallel where the alloy is low melting.

Control means are provided for initiation and termination of the powder flow by operation of the switch 24, conveniently located on the torch handle 104. To this end the switch 24 is preferably placed in series with the power supply terminals 106, 108 of the apparatus to simultaneously initiate and terminate supply of line voltage to the terminals 110, 112 of the vibrator control 72 and the lead wires 114, 116 of the solenoid valve 52. If desired, the vibrator control may be provided with a separate switch 118 which may be opened to disconnect the vibrator from the circuit.

In operation, the hopper is filled with the desired metal or alloy powder 118 having suitable welding or brazing properties; the metering regulator device is adjusted to provide the proper rate of powder feeding gas flow; the vibration regulator 72 is adjusted for the corresponding degree of vibrator operation; and the flame of the torch is adjusted at the valves 20, 22 in accordance with common practice to obtain the desired welding or brazing flame. The operator then closes the switch 24 to initiate powder feeding gas flow and hopper vibration, whereupon the powder from the hopper 28 is fed through the first metering aperture 36 into the trough 34. The metered powder stream flows along the bottom of the trough 34 with gradually increasing lineal speed as it is subjected to the increased degree of vibratory motion of the outer end portions of the trough 34. The rate of this powder flow is determined by the variable vibration and the shape and sloped disposition of the trough in cooperation with the size of the baffle apertures, particularly the size of the first baffle aperture 36. The size of the second baffle aperture 44 is reduced with respect to that of the first aperture 36 in proportion to the increased lineal speed of the powder at that second aperture, so that the chief function of the second aperture is smoothing the flow, particularly eliminating any "waves" which might result from temporary bridging friction at the first aperture or from shock from external forces causing uneven flow from the hopper. Further, the relatively large depth of the trough 34 not only imparts strength to the structure, but also prevents jamming of the powder therein, and the flared shape of the outlet 80 tends to average any remaining irregularities in the powder flow.

As shown, the connection of the gas pressure supply conduit 48 to the trough is preferably located midway between the first and second baffles 38, 40 to minimize resistance to vibration at the outer end of the trough. For the same reason, the conduit 48 is preferably somewhat flexible. At the same time, concentrated currents of gas flow adjacent the powder metering apertures 36, 44 are avoided. The gas pressure is equalized in its action on the powder by seepage therethrough and accumulation under the closed hatch 30 and by communication through the bypass 42 in the second baffle 40. Thus the metered powder and powder carrier gas flow in separate parallel streams under the same gas pressure in the single enclosure 34 for being mixed at the common outlet 80. Hence the powder flow in the trough is substantially unaffected by the gas flow from the source 46, except immediately adjacent the outlet 80.

Accordingly, the powder reaches the outlet fitting 80 at the outer end of the delivery trough 34 in a closely regulated delivery stream at a rate which is substantially independently selectable by adjustment of the vibrator control 72. Then, as the powder enters the periphery of the conical chamfer 82 of the outlet fitting, it is swept into the powder delivery gas stream, the velocity of which is separately selectable by adjustment of the metering regulator 50. Thus the powder is substantially uniformly entrained in the gas stream for conduction thereby to the torch 18 in any desired density and velocity of delivery.

The optimum setting of the regulator 50 varies somewhat with the weight of the powder used as well as the length of flame chosen, and is governed by the diameter of the powder delivery bore 98 of the torch tip 92. It has been found that with a powder delivery conduit (16) of approximately ⅛" inner diameter and a torch tip bore (98) of approximately 3/32" diameter, the powder delivery gas should be supplied at from 4 to 20 cubic feet per hour. This rate provides a lineal speed of flow through the conduit 16 in the order of 40,000 to 200,000 feet per hour, and a jet velocity of about 80,000 to 400,000 feet per hour at the torch tip. These speeds of flow assure that the powder will be maintained in uniform suspension in the gas and properly carried thereby to the workpiece. The powder carrier is preferably an inert or chemically relatively inactive gas, helium having been found to be preferable. Thus the powder delivery gas protects the powder particles from oxidation as well as operating to convey them in a well formed jet from the powder delivery bore or nozzle 98 to the work.

The apparatus of the invention operates well in the use of a wide variety of welding and brazing powders of from minus 20 mesh to minus 350 mesh. In general the vibrator should be set for a higher degree of vibration with the smaller particle sizes than with the larger powders for a given volume of feed. In any case, the volume of powder feed should be small with respect to the volume of powder carrier gas feed so that the resultant mixture will flow readily and remain uniform as it is conducted through the conduit 16 and the torch. Thus, for the powder delivery gas volume range given above, it has been determined that the first and second powder metering apertures 36, 44 should be in the order of 1/10 and 1/20 square inch cross-sectional area, respectively.

Thus it will be seen that when the apparatus has been properly adjusted, the operator may employ the device with a maximum of convenience, it being necessary only that he operate the switch 24 on the torch handle to initiate and terminate the powder at the pre-selected rate of flow. Thus the torch flame may be employed separately to preheat the work if desired. The flame jets may be arranged to lead, follow, and/or flank the point of application of the powder to fuse the powder in place by direct heat or by heat of the workpiece, as desired. If desired, the fuel gas or powder gas supplies may include known devices for introduction of volatile flux, although the provision of the inert gas about the powder particles minimizes the need for such agents. Where flux is desirable to produce acceptable welding conditions it may be admixed in finely divided condition with the metal prior to introduction into hopper 28.

The powder feed of the apparatus is extremely simple and flexible in that the rate of powder feed is adjustably determined by the amplitude of vibration, and the velocity of delivery is separately and accurately controlled by the preselection of the rate of flow of the powder delivery gas. Thus the single adjustments at the vibrator control 72 and at the gas regulator 50 are all that are necessary to vary the volume and velocity of powder feed, respectively, and thus to adapt the apparatus to a wide variety of uses. Since the powder is delivered to the outlet or mixing fitting 80 in accurately controlled rates and is thereupon swept into the gas stream flowing at an accurately controlled velocity, a very accurately controlled and dispersed delivery of the entrained powder is achieved without necessity for any special turbulence producing or other elaborately shaped discontinuities in the powder delivery bore, thereby enabling the employment of an unusually simple torch construction which need embody no powder flow adjustment within itself and which will deliver a well formed powder jet for use at any angle.

Thus it will be seen that the invention provides an improved method of controlled conduction of metal powder from a supply thereof to the point of appliaction, together with a novel apparatus adapted to carry out that method, and while only one embodiment of the invention has been shown and described in detail, it will be understood that the invention is not so limited but may be otherwise embodied within the spirit of the invention and the scope of the appended claims.

While helium has been stated as a preferred gaseous medium for transfer of the powdered metal, other inert gases may be employed to the same end, as for instance argon, nitrogen, air, carbon dioxide and others. The apparatus and method are thus adapted to be used in those circumstances where an assured flow of metal powder is desired upon a work piece under protective gas shielded conditions, the metal being, under those conditions, fused with or upon the work piece.

What is claimed is:

1. In a metal depositing apparatus, metal powder feeding means comprising a covered powder storage hopper, a covered powder feeding trough cantilever mounted by said hopper by a vibration transmitting connection to extend to one side from said hopper and forming a gas tight container therewith, the bottom of said trough being downwardly sloped toward its outer end, first baffle means comprising the hopper wall adjacent said trough and forming a first aperture in cooperation with the trough bottom, second baffle means intermediate the ends of said trough and forming a second aperture in cooperation with said trough bottom, said second aperture being of smaller cross-sectional area than that of said first aperture, electrically operable vibrator means mounting said hopper and adapted to impart vibratory motion thereto in an adjustable degree, a supply of inert gas comprising electrically operable gas delivery control means including adjustably preset flow rate control means, means connecting said supply to said trough at the tops of said trough approximately midway between said first and second baffle means, said second baffle means having bypass vent means in the upper portion thereof, and funnel shaped outlet means at the bottom of said trough at said outer end thereof, torch means comprising torch tip means, said torch tip means comprising powder nozzle means and separate flame nozzle means directed parallel to said powder nozzle means, flexible conduit means interconnecting said outlet means and said powder nozzle means, and control means comprising a switch connected to control operation of both said vibrator means and said delivery control means.

2. In a metal depositing apparatus, metal powder feeding means comprising closed container means comprising powder storage means and powder metering means, said powder metering means comprising a covered powder feeding trough cantilever mounted to extend to one side from said powder storage means, first baffle means between said powder storage means and said trough having an aperture communicating from said powder storage means to said trough, second baffle means intermediate the ends of said trough and forming an aperture in cooperation with the trough bottom, said trough being disposed to induce outward flow of material therein upon vibration thereof, adjustable electrically operable vibrator means connected to said container means and adapted to cause and control powder flow in a stream therein through said apertures toward the outer end of said trough by vibration of said trough, a supply of compressed powder carrier gas comprising electrically operable gas delivery control means including adjustable flow rate control means, means connecting said supply to said trough adapted to introduce gas therein for flow therethrough in a stream above the powder stream, and outlet means at the bottom of said trough at said outer end thereof, torch means, said torch means comprising powder nozzle means and separate flame nozzle means, flexible conduit means interconnecting said outlet means and powder nozzle means, and control means comprising a switch connected to control operation of both said vibrator means and said gas delivery control means.

3. In a metal depositing apparatus, metal powder feeding means comprising a closed powder storage hopper having a gas tight loading hatch at its top and a generally V-shaped bottom, a gas tight covered powder feeding trough rigidly cantilever mounted by said hopper and having a substantially V-shaped bottom continuous with the hopper bottom, the continuous bottom being disposed with a downward slope in the order of one degree toward the outer end of said trough, first baffle means comprising the hopper wall adjacent said trough and forming a first aperture in cooperation with said continuous bottom, second baffle means intermediate the ends of said trough and forming a second aperture in cooperation with the trough bottom, said second aperture being in the order of one-half the cross-sectional area of said first aperture, adjustable amplitude electrically operable vibrator means mounting said hopper and adapted to impart vibratory motion thereto, said motion comprising vertical and horizontal and rotational components in a vertical plane lengthwise of said trough, a supply of compressed helium comprising adjustable flow metering means and solenoid valve means, means connecting said supply to said trough at the top of said trough approximately midway between said first and second baffle means, said second baffle means having bypass vent means in the upper portion thereof, and funnel shaped outlet means at the bottom of said trough at said outer end thereof, torch means having powder inlet connection means and torch tip means, said torch tip means comprising powder nozzle means in alignment with said connection means and flame nozzle means directed parallel to said powder nozzle means, flexible conduit means interconnecting said outlet means and said connection means, control means comprising a switch mounted on said torch and connected to control operation of both said vibrator means and said solenoid valve means, and a second switch operable to discontinue operation of said vibrator means individually.

4. In a metal depositing apparatus, mechanical gravity feed means having an outlet and being adapted to dispense metal powder to said outlet at a measured adjustably constant rate in volume per unit of time, powder carrier gas supply means adapted to supply powder carrier gas at a substantially independently variable constant rate in volume per unit of time, means conducting said gas from said supply to said outlet schematically in parallel with said powder to form a combined powder-gas stream in said outlet, torch means comprising powder nozzle means, and flexible conduit means connecting said outlet to said nozzle means for conveying said combined stream thereto.

5. In a metal powder depositing apparatus, mechanical gravity feed means comprising vibrator means and comprising covered powder feeding trough means having an outlet and being adapted to dispense metal powder to said outlet at a measured adjustably constant rate in volume per unit of time by and upon vibration of said trough means by said vibrator means, powder carrier gas supply means adapted to supply powder carrier gas at a substantially independently variable rate in volume per unit of time, means conducting said gas from said supply to said trough means for conduction thereby schematically in parallel with said powder to said outlet to form a combined powder-gas stream therein, torch means comprising powder nozzle means, flexible conduit means connecting said outlet to said nozzle means for conveying said combined stream thereto.

6. In a metal powder depositing apparatus, mechanical gravity feed means comprising electrically operable vibrator means and comprising elongate covered powder feeding trough means having a powder stream metering inlet at one end and an outlet at the other end and comprising stream smoothing means therebetween, said trough means being adapted to receive metal powder from said inlet and to deliver the same to said outlet at a measured adjustably constant rate in volume per unit of time by and during vibration of said trough means by said vibrator means, powder carrier gas supply means adapted to supply powder carrier gas at a substantially independently variable constant rate in volume per unit of time, means including an electrically operable valve conducting said gas from said supply to said trough means for conduction thereby schematically in parallel with said powder to said outlet to form a combined powder-gas stream therein, torch means comprising powder nozzle means, flexible conduit means connecting said outlet to said nozzle means for conveying said combined stream thereto, and control switch means on said torch means connected to control operation of both said vibrator means and said valve.

7. In a metal depositing apparatus, mechanical feed means comprising adjustable vibrator means, said feed means having an outlet and being adapted to dispense metal powder to said outlet at a measured adjustably constant rate in volume per unit of time, powder carrier gas supply means adapted to supply powder carrier gas at a substantially independently variable rate in volume per unit of time, means conducting said gas from said supply into said feed means and therewithin to said outlet in parallel contact with but flowing substantially independently of said powder until issuing through said outlet therewith as a combined powder-gas stream, torch means comprising powder nozzle means, and flexible conduit means connecting said outlet to said nozzle means for conveying said combined stream thereto.

8. In a metal depositing apparatus, mechanical feed means comprising vibrator means, said feed means having an outlet and being adapted to dispense metal powder to said outlet at a first predetermined constant rate in volume per unit of time by and during operation of said vibrator means, powder carrier gas supply means adapted to supply powder carrier gas at a second predetermined constant rate in volume per unit of time, means conducting said gas from said supply to said outlet schematically in parallel with said powder to form a combined powder-gas stream in said outlet, torch means comprising powder nozzle means, and flexible conduit means connecting said outlet to said nozzle means for conveying said combined stream thereto.

9. In a metal depositing apparatus, mechanical feed means having an outlet and being adapted to dispense metal powder to said outlet at a first predetermined rate in volume per unit of time, powder carrier gas supply means adapted to supply powder carrier gas at a second predetermined rate in volume per unit of time, means conducting said gas from said supply to said outlet schematically in parallel with said powder to form a combined powder-gas stream in said outlet, torch means comprising powder nozzle means, and flexible conduit means connecting said outlet to said nozzle means for conveying said combined stream thereto.

10. In a metal depositing apparatus, mechanical feed means having an outlet and means adapted to dispense metal power by urging the same progressively toward said outlet in a stream body, powder carrier gas supply means adapted to supply powder carrier gas, means conducting said gas from said supply to said outlet schematically in parallel with said power to take up and entrain said stream body at said outlet for sweeping the powder therethrough, applicator nozzle means for directing said powder gas stream toward a workpiece, conduit means connecting said outlet to said nozzle means for conveying said combined stream thereto, and means providing heat for fusing the powder metal to the workpiece.

11. In a metal powder depositing apparatus, mechanical feed means comprising covered powder feeding trough means having an outlet, said feed means comprising means providing a stream body of metal powder in said trough means and means urging said stream body along the bottom of said trough means toward said outlet at a first predetermined rate in volume per unit of time, powder carrier gas source means adapted to supply powder carrier gas at a second predetermined rate in volume per unit of time, means conducting said gas to said trough means for conduction thereby as a gas stream therein, said gas stream being directed toward said outlet above said powder stream body in contact therewith but dynamically substantially independent therefrom, said gas and powder merging at and in said outlet to form a combined powder-gas stream therein, applicator means comprising nozzle means for directing said powder-gas stream toward a workpiece and conduit means connecting said outlet to said nozzle means, and means providing heat for fusing the powder metal to the workpiece.

References Cited in the file of this patent

UNITED STATES PATENTS

| Number | Name | Date |
| --- | --- | --- |
| 1,441,094 | Jenkins | Jan. 2, 1923 |
| 1,617,166 | Schoop | Feb. 8, 1927 |
| 1,654,509 | Claus | Dec. 27, 1927 |
| 1,781,603 | Schori | Nov. 11, 1930 |
| 1,807,807 | Swords | June 2, 1931 |
| 1,826,860 | Armstrong | Oct. 13, 1931 |
| 2,049,575 | Sutton | Aug. 4, 1936 |
| 2,146,315 | Reinhardt | Feb. 7, 1939 |
| 2,317,173 | Bleakley | Apr. 20, 1943 |
| 2,389,702 | Ullmer | Nov. 27, 1945 |
| 2,533,331 | Skinner | Dec. 12, 1950 |
| 2,568,332 | Genovese | Sept. 18, 1951 |